United States Patent [19]

Attinello et al.

[11] Patent Number: 5,645,660
[45] Date of Patent: *Jul. 8, 1997

[54] DESIGN PATTERNS FOR A TIRE SIDEWALL

[75] Inventors: John Steven Attinello, Hartville; Samuel Patrick Landers, Uniontown, both of Ohio

[73] Assignee: The Goodyear Tire & Rubber Company, Akron, Ohio

[*] Notice: The term of this patent shall not extend beyond the expiration date of Pat. No. Des. 379,167.

[21] Appl. No.: 497,055

[22] Filed: Jun. 28, 1995

[51] Int. Cl.$^6$ .................................................. B60C 13/02
[52] U.S. Cl. .......................................... 152/523; D12/152
[58] Field of Search ............................. 152/523, 524; D12/152

[56] References Cited

U.S. PATENT DOCUMENTS

| | | | |
|---|---|---|---|
| D. 123,530 | 11/1940 | Ewart | D12/152 |
| 1,428,817 | 9/1922 | Swan | 152/523 |
| 2,800,098 | 7/1957 | Crosby, Jr. | 152/523 |
| 5,303,758 | 4/1994 | Clementz et al. | 152/523 |

FOREIGN PATENT DOCUMENTS

| | | | |
|---|---|---|---|
| 508091 | 10/1992 | European Pat. Off. | 152/523 |
| 5-96914 | 4/1993 | Japan | 152/523 |

Primary Examiner—Geoffrey L. Knable
Attorney, Agent, or Firm—David L. King

[57] ABSTRACT

A tire sidewall having a surface with a distinctive design pattern is described. The pattern has a plurality of ridges 20 of similar cross-sectional shapes of varying sizes, each ridge 20 being substantially parallel to an adjacent ridge 20. The pattern has a plurality of parallel ridges 20 extending in a direction between 45° and 0° relative to the radial direction. The ridges 20 of the pattern vary in size or depth and are preferably arranged in a repeating pattern varying from small to large to small sizes or depths. The preferred patterns have at least three distinct sizes or depths of ridges arranged in a sinusoidal or a sawtooth configuration and have a variation in cross sectional height of at least 0.010 in preferably 0.015 of an inch between consecutive sizes. The design patterns when incorporated into the sidewall 12 of a tire 10 may form a circumferentially continuous wide decorative band with striped or solid alpha-numeric markings superimposed over a portion of the wide decorative band.

2 Claims, 11 Drawing Sheets

DESIGN PATTERNS FOR A TIRE SIDEWALL

BACKGROUND

This invention generally pertains to a design pattern for opaque articles. The invention is particularly applicable to the black sidewalls of rubber tires.

Manufacturers have for many years placed numerals, letters, characters or other designations upon the sidewalls of tires to enhance the appearance and marketability of their products. Such markings are described in U.S. Pat. Nos. 4,198,744 and 4,823,856.

The subject matter of U.S. Pat. No. 4,198,774, issued Apr. 22, 1980, was invented by Roberts and Lowther. The invention describes the use of lineal projections which are substantially straight, parallel, and of substantially identical cross-section to form indicium. An indicium is described as a letter or numeral or the like.

The latter issued patent of Mr. Charles W. Roberts, U.S. Pat. No. 4,823,856, issued Apr. 25, 1989, describes the use of serrated outline markings for the sidewall of a tire. The invention relates to a design of a substantially flat ungrooved portion surrounded by a serrated portion which includes a plurality of ribs separated by grooves. The combination of the flat design surrounded by a serrated portion defines an indicium.

The present invention employs the use of a design pattern which improves the visual appearance of an opaque article by increasing the visual contrast of the surfaces of the articles and simultaneously effectively concealing surface variations of the article. The invention is particularly well-suited for the sidewall of a tire, particularly a black sidewall tire. The combination of design patterns in at least one embodiment of the invention, has the effect of making the sidewall markings boldly stand out.

SUMMARY OF THE INVENTION

This invention relates to a tire having a sidewall, the sidewall having a surface with a distinctive design pattern. Pattern A has a plurality of ridges of similar substantially triangular or trapezoidal cross-sectional shapes, each ridge being substantially radially extending substantially parallel to an adjacent ridge. Each ridge has a peak height, a depth, a base width and a spacing from base to adjacent ridge base. The ridges vary in height or depth, as measured from peak to spacing S for height and from the radially outermost peak to the space S for depth, the varied feature of one ridge being different from an adjacent parallel ridge. The pattern of ridges having ridges of two or more distinct height or depths arranged in a repeating sequence. The ridges have a variation in height of $h_L > h_{M2} > h_{M1} > h_S$ or a variation of depth $d_L > d_{M2} > d_{M1} > d_S$, the repeated sequence being from small to large $h_S$, $h_{M1}$, $h_{M2} h_L$, $h_{M2}$, $h_{M1} h_S$ or $d_S$, $d_{M1}$, $d_{M2}$, $d_L$, $d_{M2}$, $d_{M1}$, $d_S$ in repeating fashion. The preferred sequences are sinusoidal or sawtooth in configuration. The pattern A has a plurality of parallel ridges extending in an angular direction between 0° and 45° relative to the radial direction. The preferred tire has a sidewall wherein pattern A has substantially radially extending ridges of three sizes extending outwardly from three distinct depths forming a circumferentially continuous wide decorative band on the surface of the tire sidewall. A pattern B is superimposed over a portion of pattern A. Pattern B has a plurality of parallel ridges forming alphanumeric markings within the wide decorative band.

DEFINITIONS

"Axial" and "axially" means the lines or directions that are parallel to the axis of rotation of the tire.

"Circumferential" means lines or directions extending along the perimeter of the surface of the annular tread perpendicular to the axial direction.

"Light deflection" means that as light strikes a surface, the reflected light is angularly directed relative to the angle of indigence of the light source yielding what appears to be a light absorbing characteristic to an observer who is position in general alignment with the light source.

"Light reflection" means that as light strikes an object, the reflected light is generally aligned with the angle of incidence yielding what appears to be a shiny or reflective characteristic to an observer who is positioned in general alignment with the light source.

"Radial" and "radially" mean directions radially toward or away from the axis of rotation of the tire.

"Sidewall" means that portion of a tire between the tread and the bead.

"Tread" means that portion of the tire that comes into contact with the road under normal inflation and load.

DETAILED DESCRIPTION OF THE INVENTION

Figure 1:
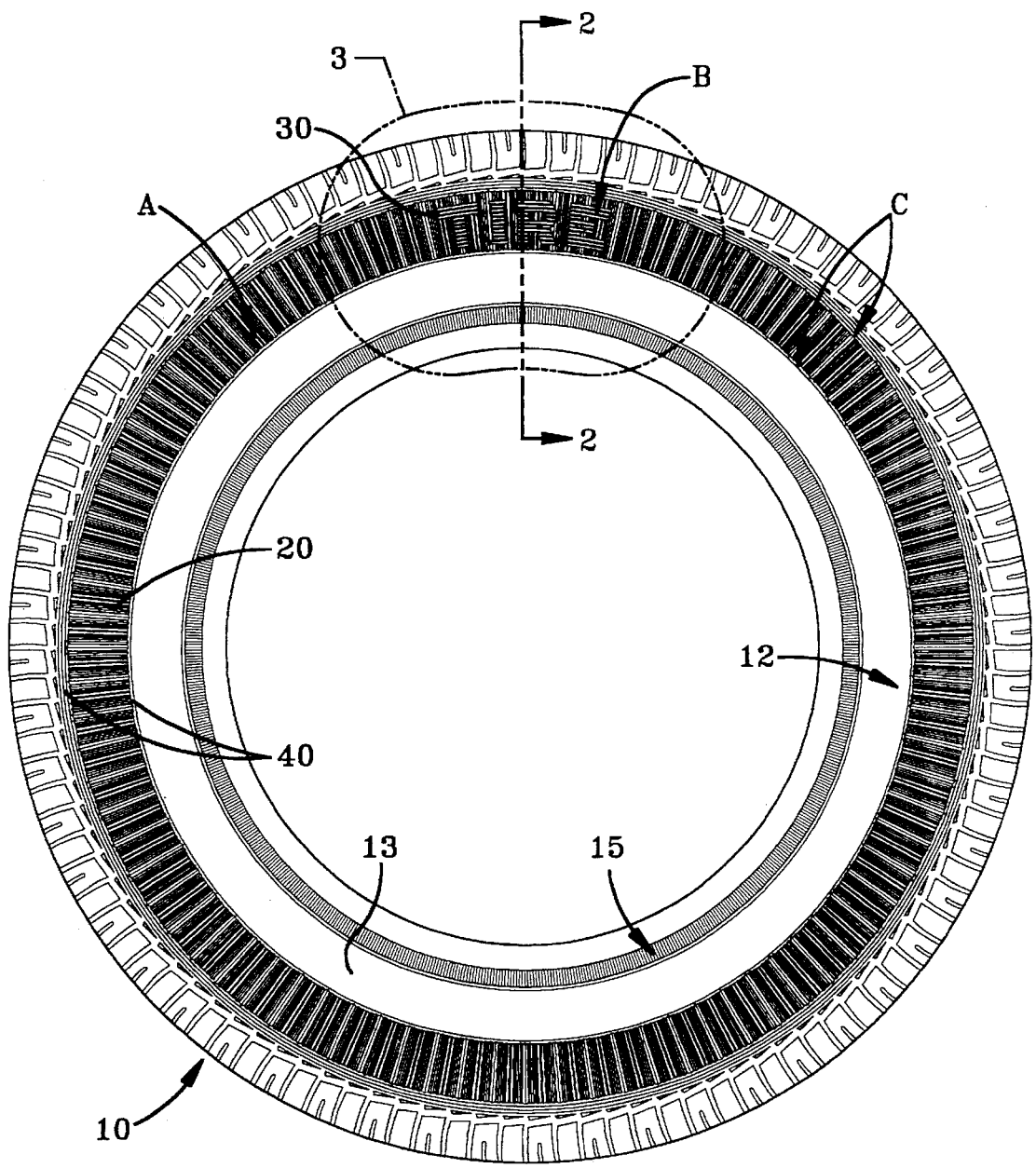
FIG. 1 illustrates a side view of a tire with a pattern A, pattern B and pattern C shown on the sidewall of the tire.

A tire 10 made according to the invention is shown in FIG. 1. A side view of a tire 10 with design patterns A, B and C on the sidewall 12 of the tire 10 is illustrated in FIG. 1.

In the embodiment shown in exemplary FIG. 1, pattern A forms a wide decorative band comprised of ridges 20. The ridges 20 of pattern A each extend in a substantially radial direction. In the illustrated embodiment, ridges 20 of pattern A extend equally in length and have similar cross-sectional shapes. Each radially extending ridge 20 appears to be substantially parallel to an adjacent ridge 20.

Design pattern B is illustrated in FIG. 1 may be superimposed over a portion of the design pattern A. Pattern B has a plurality of parallel ridges 30 extending perpendicularly relative to the ridges 20 of the superimposed portion of pattern A.

As illustrated in FIG. 1, the plurality of ridges 30 of pattern B can be oriented so as to form words. The exemplary word TIRES is illustrated, the word TIRES overlaying or being superimposed over some of the ridges 20 of pattern A. Pattern A forms a background for the pattern B markings.

As further illustrated in FIG. 1, pattern C has a plurality of parallel ridges 40 perpendicularly oriented relative to the ridges 20 of pattern A and wherein the ridges 20 of pattern A intersect two ridges 40 of pattern C. In the preferred embodiment illustrated in FIG. 1, pattern C consists of one or more adjacent circumferentially-continuous ridges 40 radially outward of the ridges 20 of pattern A and one or more circumferentially-continuous annular ridge 40 radially inward of the ridges 20 of pattern A.

Figure 2:
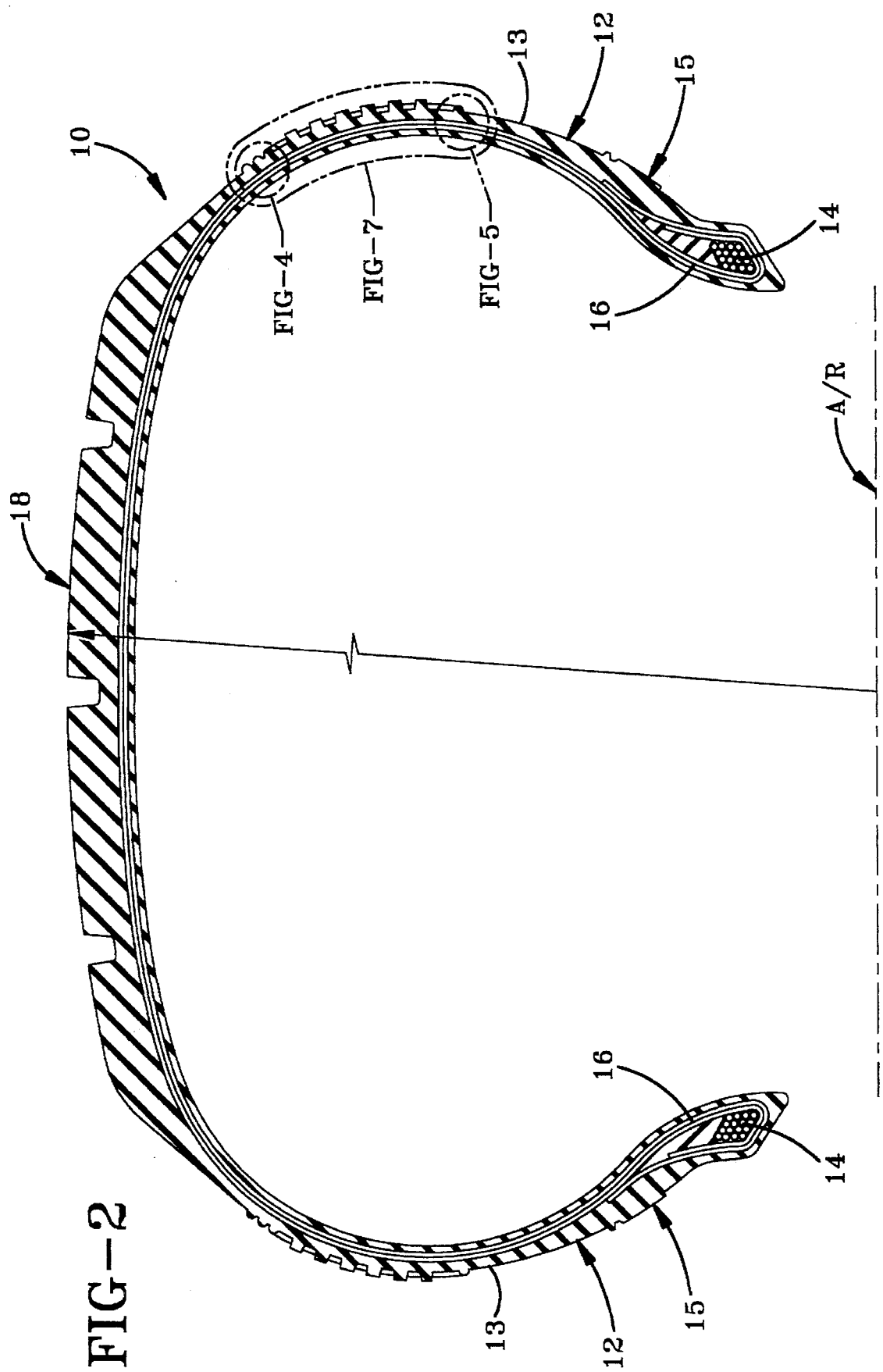
FIG. 2 is a cross sectional view of the tire of FIG. 1.

FIG. 2 illustrates a cross sectional view of the tire 10 of FIG. 1 taken along lines 2—2. The tire 10 has an axis of rotation (A/R), a pair of annular beads 14, carcass plies 16 wrapped around the annular beads 14, a tread 18 disposed over the carcass plies 16 in a crown area of the tire and sidewalls 12 disposed between the tread 18 and the beads 14. A sidewall 12 of the tire 10 has the design pattern A, B and C located on the exterior surface 13 of the sidewall. Near the bead region a secondary decorative band 15 is illustrated.

Figure 3:
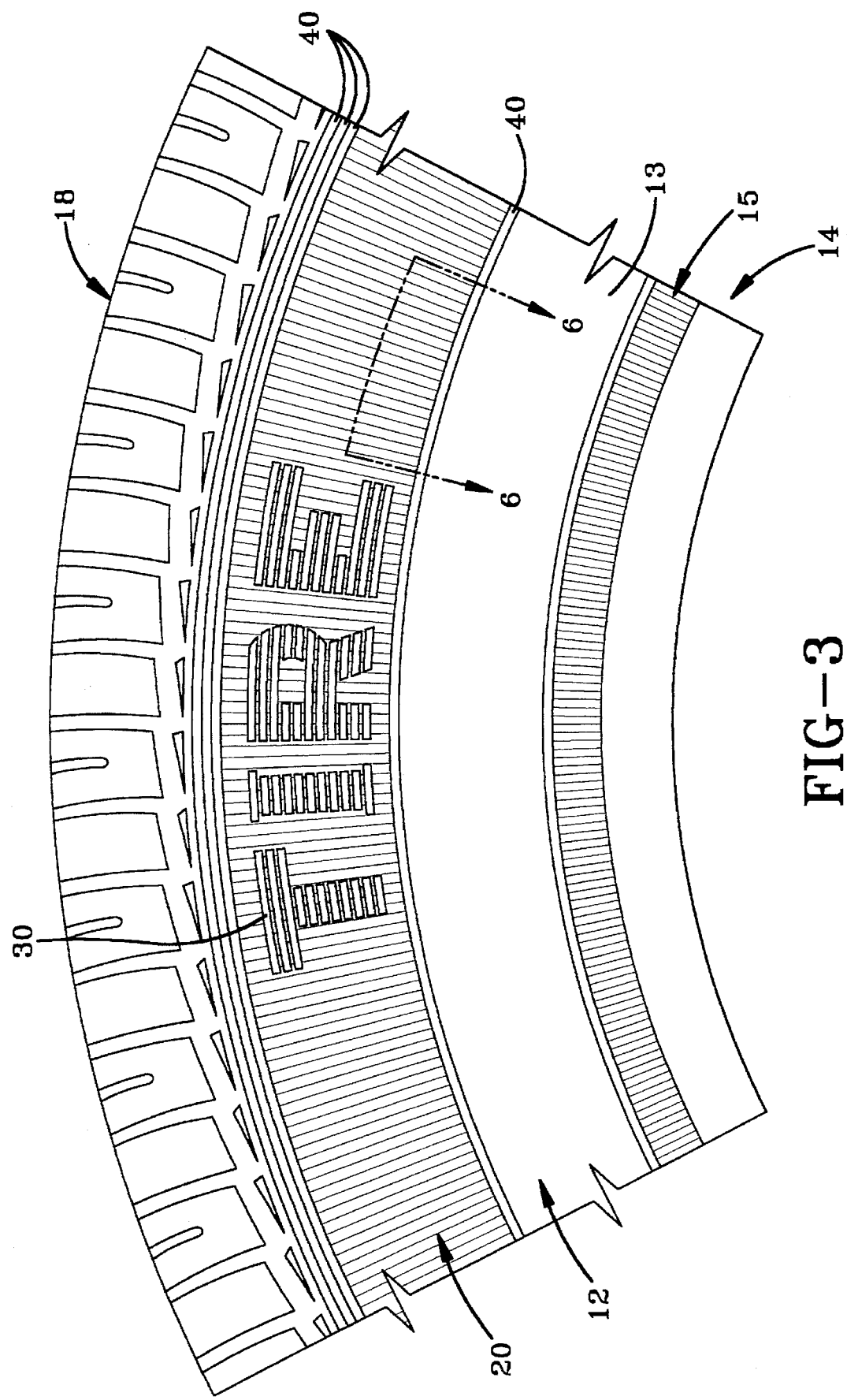
FIG. 3 is an enlarged view of the portion of pattern, A, B and C.
Figure 6:
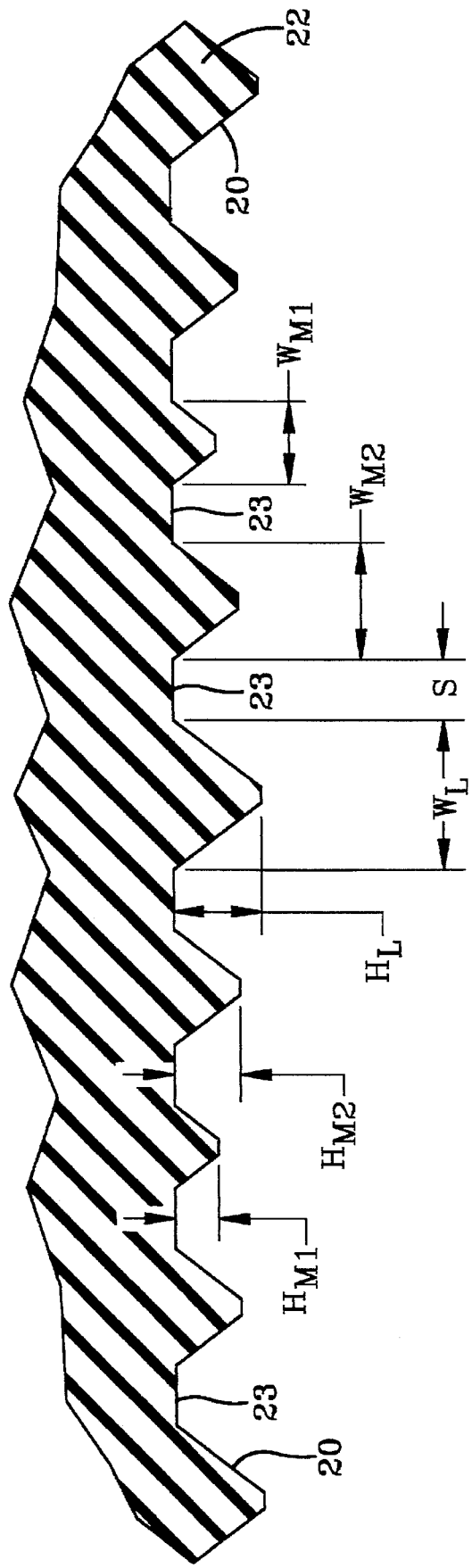
FIG. 6 is an enlarged cross sectional view of pattern A taken from FIG. 3.

FIG. 3 is an enlarged view of a portion of design patterns A, B and C. The ridges 20 of pattern A as shown in FIG. 6 are preferably of trapezoidal cross-sectional shape which approximate a triangular cross section. The bases (w) of the trapezoidal cross sections are positioned close or intersect such that pattern A exhibits minimal surfaces parallel to the tire sidewall 12. The use of these trapezoidal cross sections yield a generally light deflecting or nonreflective background when viewed from a perpendicular position relative to the sidewall 12.

Figure 7:
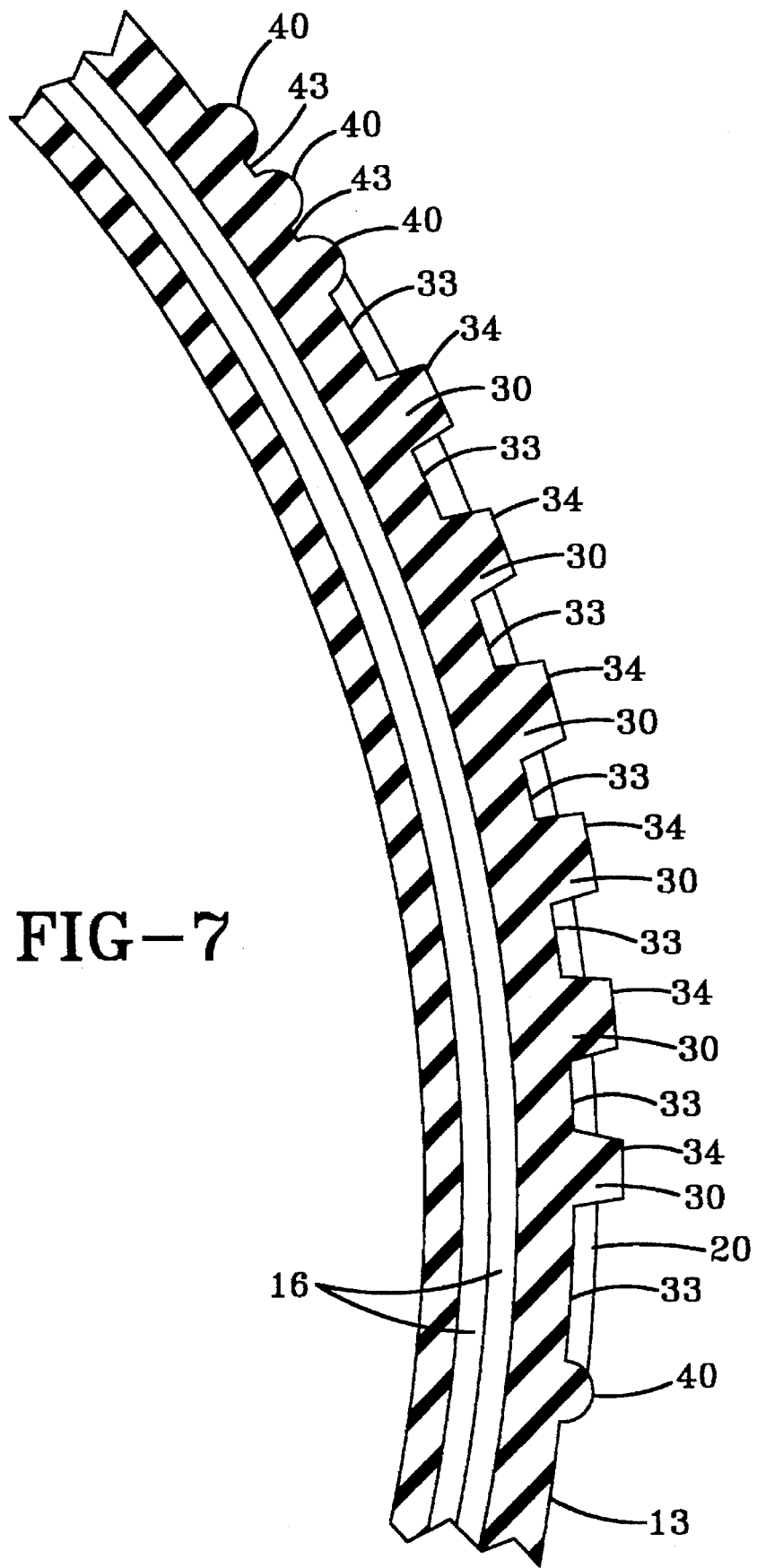
FIG. 7 is an enlarged cross sectional view of pattern B taken from FIG. 3.

The design pattern B as illustrated at FIG. 3 is comprised of a plurality of ridges 30 having a trapezoidal shape approximating flat rectangular or square cross sectional shapes. As shown in FIG. 7, the ridges are spaced a sufficient distance to provide a light shadowing space 33 between a flat light reflecting surface 34. The flat surfaces 34 yield a pattern exhibiting a light contrasting appearance whereby the observer can readily distinguish the design patterns of B which stand out when compared to the background patterns A and C.

Figure 3A:
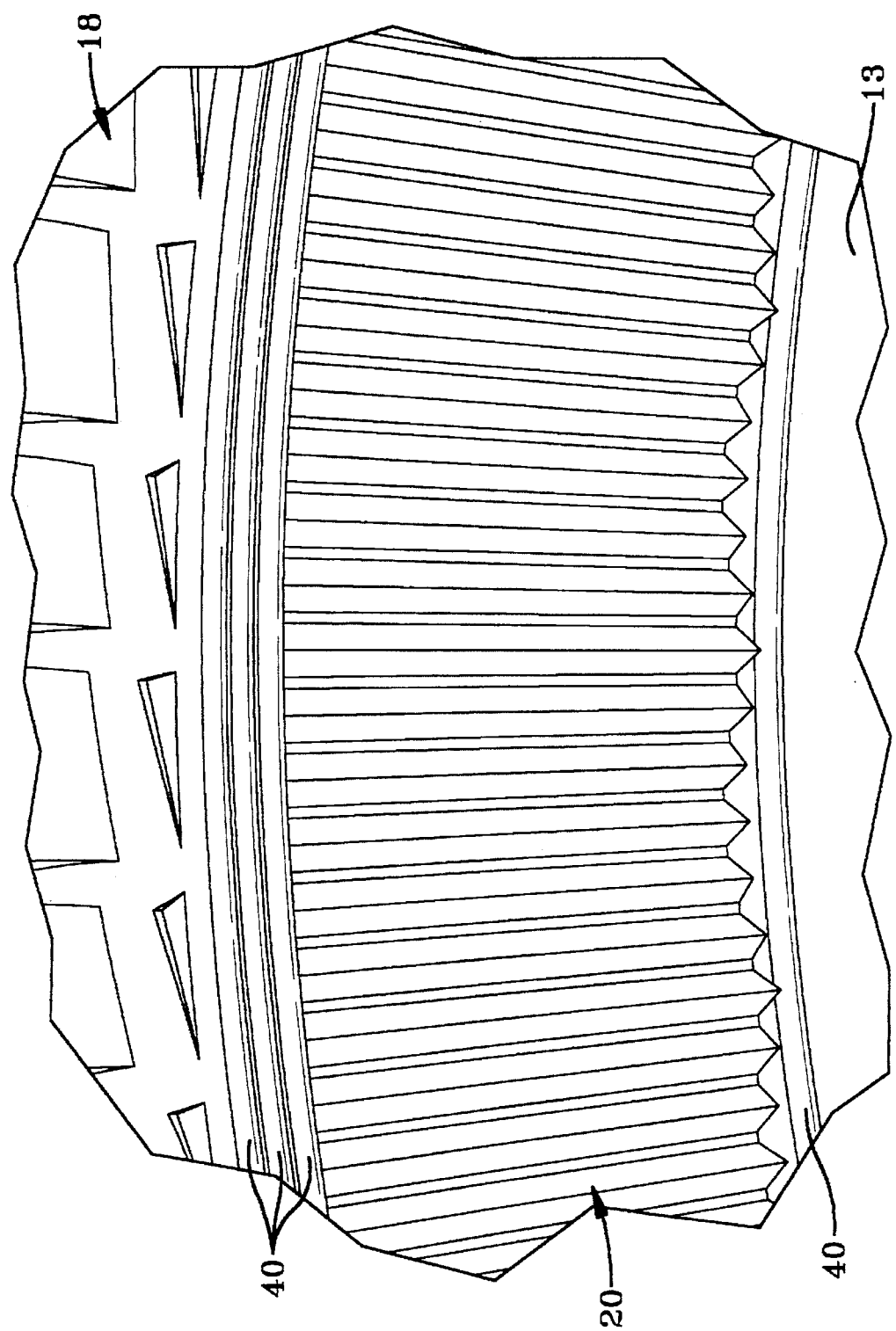
FIGS. 3A and 3B are perspective views taken from FIG. 3.
Figure 3B:
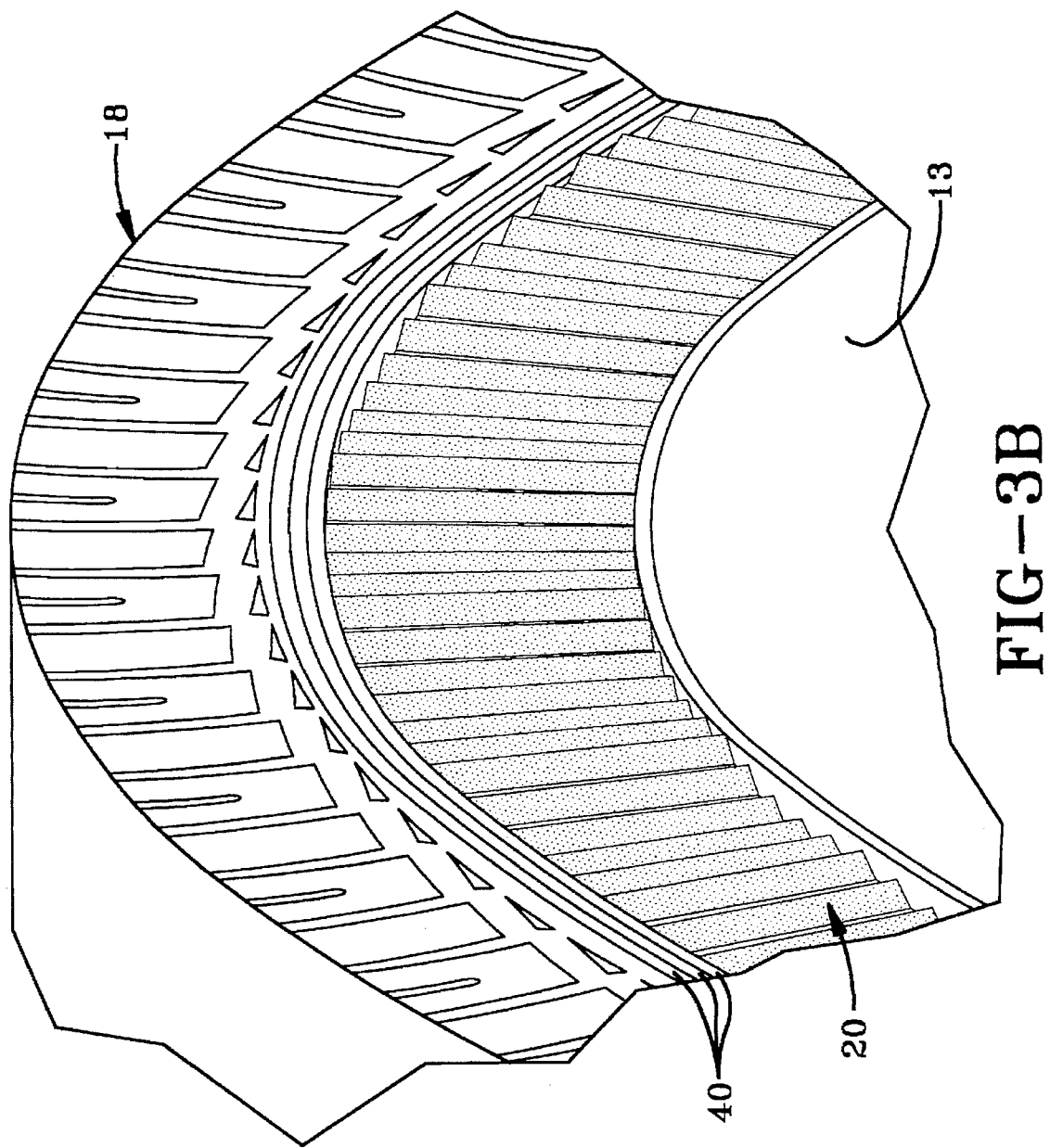

FIG. 3A shows the pattern A enlarged and tilted slightly to reflect the repeating pattern of variation in depth (d) or height (h) of the ridges 20. FIG. 3B is a perspective view of this portion of the tire further exhibiting the sequenced or repeating pattern variation of pattern A formed by the depth or height variation of the ridges 20.

Figure 4:
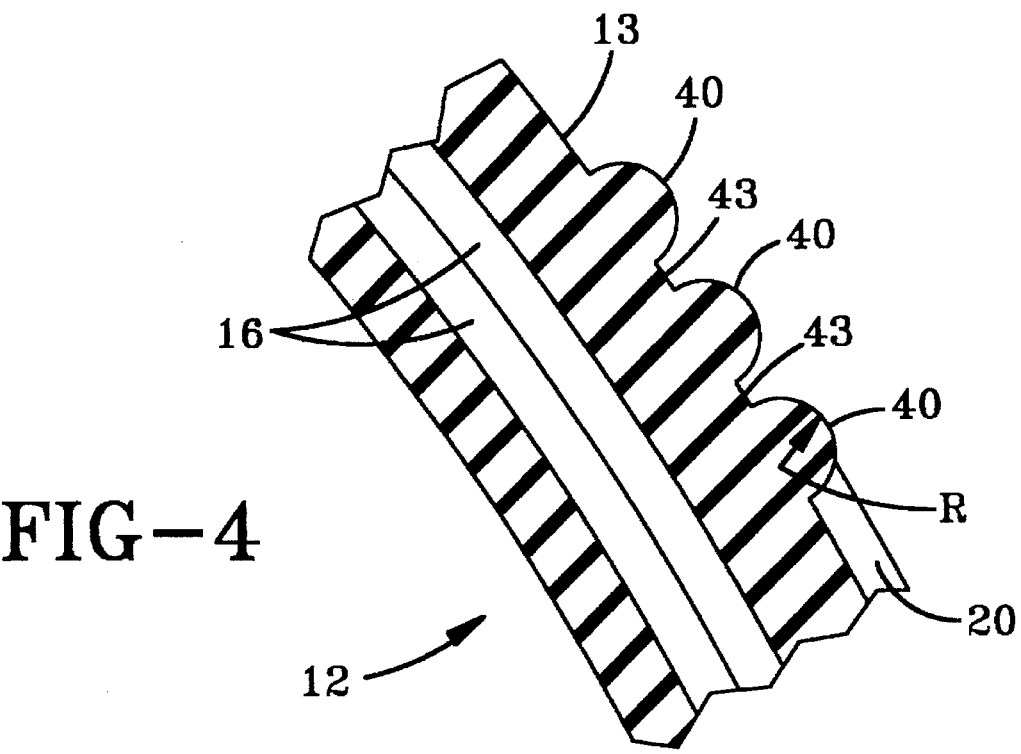
FIG. 4 is an enlarged view of a radially outer portion of pattern C taken from FIG. 2.

FIG. 4 illustrates an enlarged view of an upper portion of pattern C taken from FIG. 2. The annular circumferential ridges 40 of design pattern C have a cross section different from pattern A. In a preferred embodiment as illustrated, the cross sectional shape of the ridges is circular. The circular shapes, although generally light deflecting, are ideally spaced to yield a small flat light shadowing surface 43 between adjacent upper ridges 40. The upper ridges 40 of pattern C distinguishes the sidewall patterns A and B from the tread in the shoulder region. At the lower region a single ridge 40 of pattern C is shown of circular cross section. The circular cross sections are formed with a full radius (R). The cross section extends a distance h from the surface of the sidewall; in the preferred embodiment, the height "h" is 0.6 mm and the radius R of the cross section is 0.6 mm. Adjacent ridges 40 are spaced a distance of 0.2 mm. The upper and lower patterns may include one or more such ridges 40. The illustrated embodiment shows an upper pattern with three ridges 40 and a lower portion with only one ridge 40.

Figure 5:
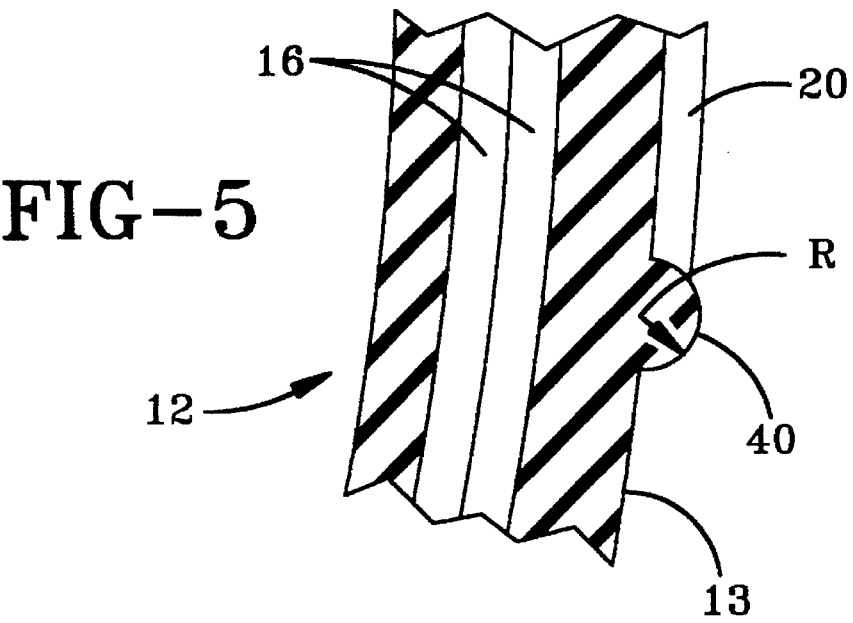
FIG. 5 is an enlarged view of a radially inner portion of pattern C taken from FIG. 2.

FIG. 5 is an enlarged view of a lower portion of pattern C taken from FIG. 2. The lower ridge 40 of pattern C has an identical cross section to those of the upper pattern in the preferred embodiment as illustrated. The shape and size of the ridges 40 of design pattern C alternatively could be dissimilar. One of the primary functions of design pattern C is to provide a border or boundary for the overall sidewall design formed by the combination of patterns A, B and C. The pattern C also provides a means to improve venting of gases in the region of the sidewall during the molding of the tire.

FIG. 6 is an enlarged cross-sectional view taken along lines 6—6 of FIG. 3. The view illustrates three distinct sizes of ridges 20. Each ridge 20 has the base $W_L$, $W_{M1}$, $W_{M2}$ extending from a flat surface 23 to a height $H_L$, $H_{M1}$, $H_{M2}$. Each ridge 20 is spaced a uniform distance S between bases.

FIG. 7 is an enlarged cross sectional view of pattern B taken from FIG. 3. The parallel ridges 30 of pattern B are superimposed over the generally triangular trapezoidal shaped ridges 20 of pattern A and spaced between two of the annular ridges 40 of pattern C. To enhance the visual appearance of the pattern B ridges 30, it is preferred that the ridges of pattern B extend outward from the surface of the sidewall a distance greater than the distance "h" of the ridges 20, 40 of pattern A and pattern C. In the preferred embodiment, the ridges 30 of pattern B extend from the sidewall a distance of 1.1 mm. The ridges 20, 40 of pattern A and pattern C extend from the sidewall 12 of the tire 10 distances of 0.45 mm and 0.6 mm respectively. It is not considered essential that the ridges 40 of pattern C extend a distance less than the ridges 30 of pattern B. Pattern B, however, preferably should extend outwardly from the ridges 20 of pattern A in order to achieve the most striking visual appearance. The trapezoidal ridges 30 of pattern B are preferably of a substantially rectangular cross section. The ridges 30 extending outwardly from the sidewall and beyond the outermost extension of the ridges 20 of pattern A. Ideally, the ridges 30 have a generally flat outermost surface 34 which will reflect light. Alternatively is indicia may consist of solid block lettering or numerals.

Figure 8:
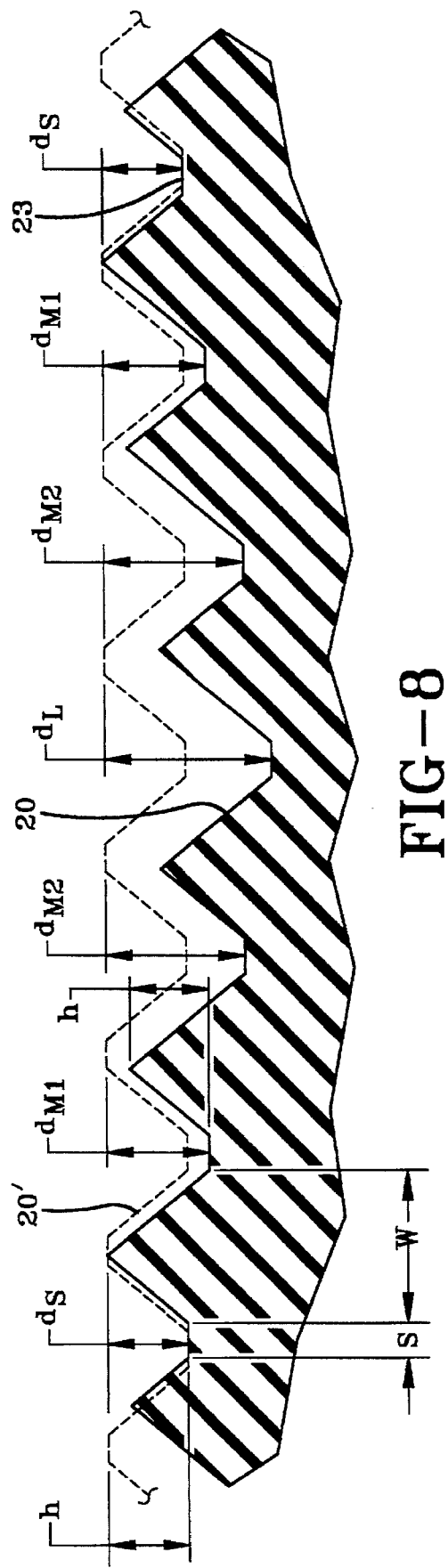
FIG. 8 is a cross-sectional view of a portion of pattern A illustrating the use of parallel ridges wherein the cross sectional shapes of adjacent ridges are similar but the depth (d) varies.

FIG. 8 is an enlarged cross sectional view of pattern A wherein the depth (d) of the ridges 20 is varied. The view illustrates the trapezoidal ridges 20 of generally triangular cross sectional shape. To facilitate molding and mold construction, the adjacent bases may be spaced a distance (s) of less than ⅔ the height (h) of the ridge 20 and the space (s) should be less than 50% the width (w) of the base. This insures that the flat surface 23 formed by the spacing of the ridges 20 is minimized. The spaced distance (s) is effectively shadowed by the adjacent ridges 20 insuring a light deflecting or nonreflective background. In the embodiment shown, each base of ridge 20 is spaced a distance (s) of less than one half the width (w) of the base. In the embodiment the distance (s) was set at 0.3 mm. The very tip of the triangular shaped ridge 20 may be truncated in order to facilitate mold construction. Each ridge extends lengthwise (1) a distance of at least 2.5 cm, preferably at least 3.0 cm.

The ridges 20 are of at least two distinctive depths (d) or sizes, preferably about three or more depths or sizes, each distinct size having a depth (d) or height (h) that one or both, (d) or (h) is distinct varying from the other adjacent ridges 20. By arranging the different sized ridges or ridges of different depths (d) in a repeating array or sequence a unique background pattern can be achieved. The subtle undulating characteristics created visually enhances the background pattern giving it a more striking appearance. As shown in the illustration FIG. 8, the ridges are varied from small, medium and large depth $d_S$, $d_{M1}$, $d_{M2}$ and $d_L$ in a pattern $d_S$, $d_{M1}$, $d_{M2}$, $D_L$, $d_{M2}$, $d_{M1}$, $d_S$, etc., repeated around the entire circumference of the tire sidewall. This variation in depth (d) creates a masking effect hiding surface imperfections, commonly referred to as sidewall undulations. The prior art ridge $20^1$ pattern shown superimposed in dashed lines simply continued sidewall undulations visually unsightly effect across the pattern of uniform ridges, the undulation generally extending radially across a large portion of the tire sidewall. Although unsightly, these imperfections play little or no role in the tire's performance. However, some purchasers of a tire could be offended by these sidewall blemishes. Accordingly, tire manufacturers would be forced to discount the cost of such tires other simply would scrap tires rather than discount the blemished product. This novel concept enables the otherwise useful product to be used without forcing the manufacturer to choose between discounting the tires or scrapping them or the customer being forced to choose between paying more for a cosmetically perfect tire or have a tire with visually unappealing appearance. The present invention eliminates the need to choose between two inefficient choices.

Figure 8A:
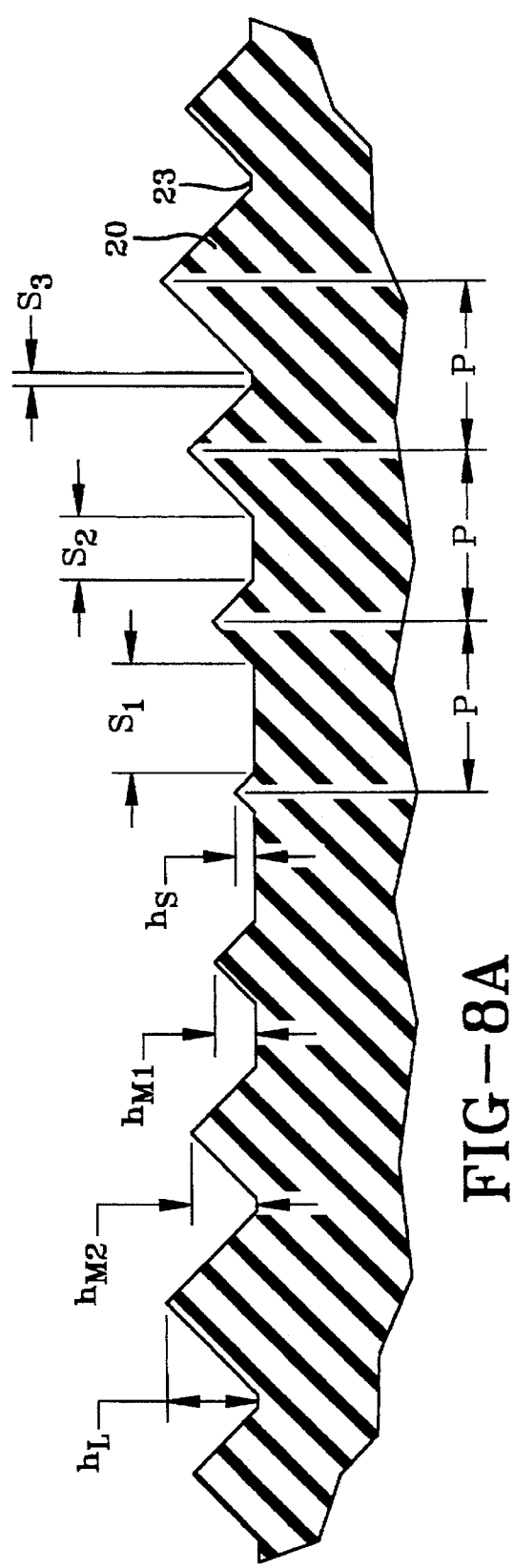
FIG. 8A is a cross-sectional view of a portion of pattern A wherein the ridges are equally spaced center to center and vary in depth and size and FIG. 8B is a perspective view of the cross-section shown in FIG. 8A.
Figure 8B:
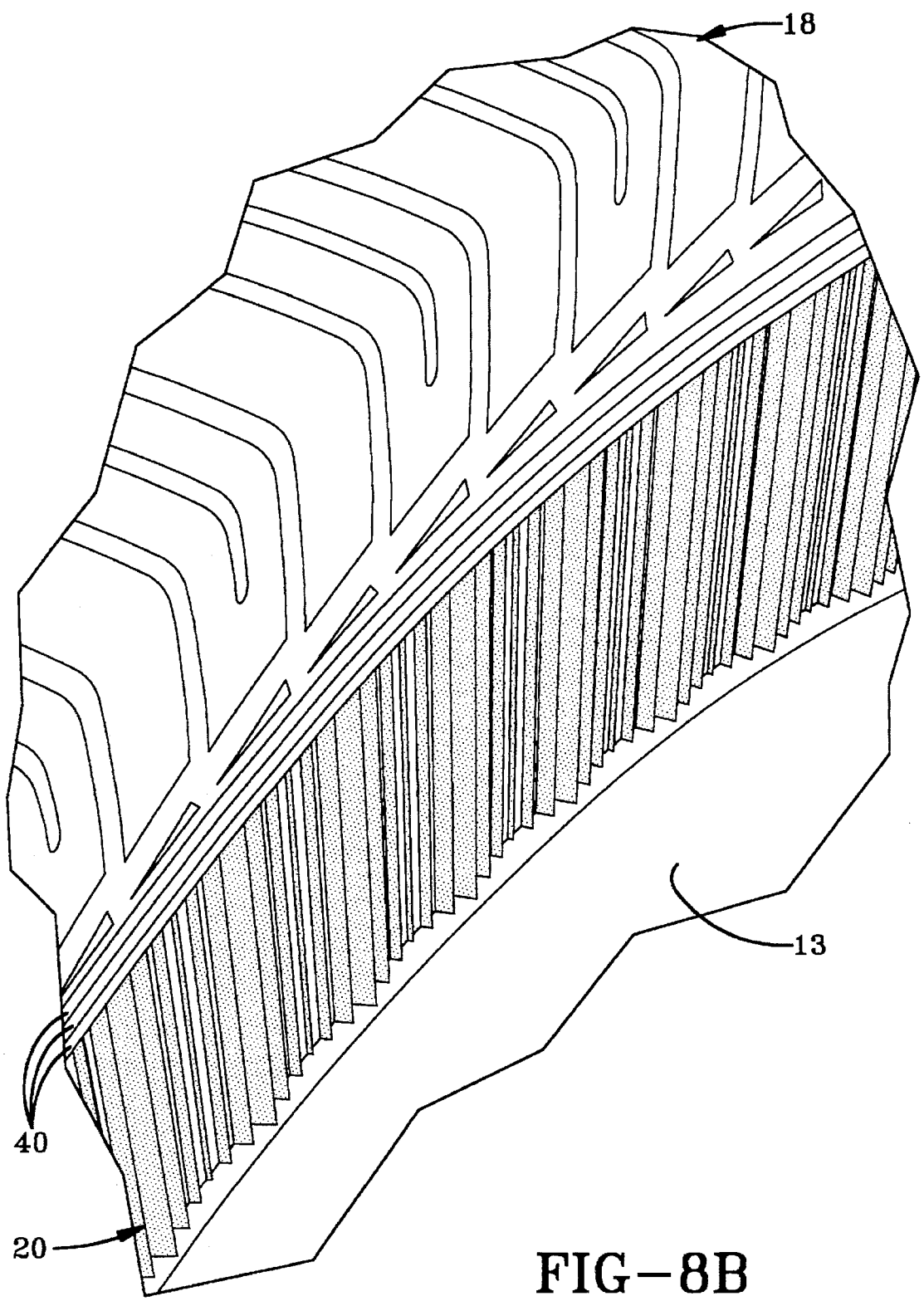

The invention as shown in FIG. 8 has ridges 20 of varying depth (d) and each ridge had a base width (W) a minimum cross-sectional height (h) and a spacing (s) between bases. As a preferred alternative to the varying depth (d) or in combination with it the base width (W), the height (h) can be varied, more preferably from all four, depth, width, height, and spacing are varied to achieve the desired appearance as shown in FIGS. 8A and 8B. It is believed important that the variation be such that it is sequenced in a repeating pattern. One reason it is believed preferred that the depth be varied is that the amount of rubber employed in the sidewall area can be minimized resulting in a minor but measurable savings in rubber.

Additionally, the variation in depth provides heat dissipating cool zones where the rubber is thinnest. This is particularly beneficial in the area of upper sidewall which flexes generating heat.

Finally, the fact that the ridges vary in depth means that when the tire scruffs against a curb only the outermost ridges may be damaged such that the scruff blemish damage can be minimized thus having the tire maintain its new tire look longer that was possible in the prior art tires.

In FIGS. 8A and 8B, the preferred embodiment of the invention is shown. The pattern A as illustrated varies in both size, depth (d), height (h), base width (w), and base to base spacing (s). The peak-to-peak centerline (p) of each ridge 20 was equally spaced. This equal spacing of the centerlines meant that an automated or computer controlled machining of the mold pattern could be accomplished by the same cutting tool. By simply varying the depth of cutting penetration, ridges of varying size and depths could be formed into the mold. The resultant tire 10 when molded exhibiting the sinusoidal pattern as shown in FIGS. 8A and 8B.

Figure 9:
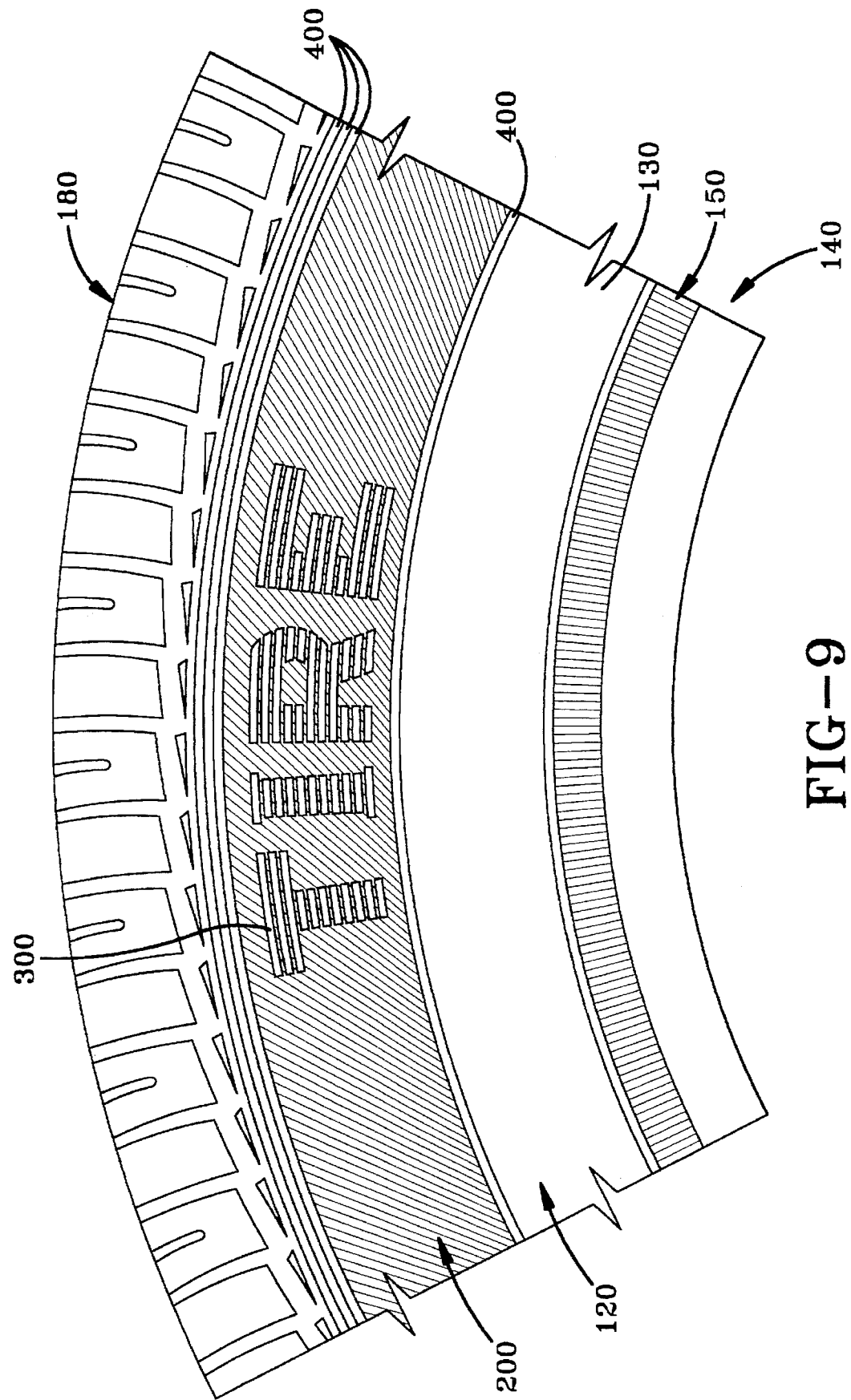
FIG. 9 is a view of a portion of a tire sidewall illustrating an embodiment where 45° angularly oriented ridges form the background pattern.

FIG. 9 illustrates an embodiment of the invention wherein the background pattern A has slanted ridges 200. A portion of a tire sidewall 120 is illustrated. The sidewall 120 has an exterior surface 150, a pair of annular beads 140, a tread 180, a secondary decorative band 150, and three design patterns forming a wide decorative band. The background design pattern is comprised of a plurality of slanted or angularly extending ridges 200. The ridges 200 as illustrated are oriented at about a 45° angle relative to the radial direction. Each ridge is substantially oriented parallel to the adjacent ridge 200. A plurality of parallel ridges 300 are superimposed over a portion of the ridges 200. The ridges 300 extend generally circumferentially and are arranged in the exemplary FIG. 9 forming the word TIRE. A third pattern of ridges 400 is illustrated circumferentially bordering the background pattern. Each of the ridges 200 intersect two of the ridges 400.

The invention as described above has several distinct advantages in addition to improved appearance. The ridges 30 of pattern B are believed to be preferable to a solid indicium because the use of multiple ridges tend to mask or conceal slight molding imperfections. A solid indicium tend to highlight any small imperfection because the observer's attention is drawn to the imperfection.

A second benefit of the invention is that the intersections of the ridges 20 of pattern A with the annular ridges 30 of pattern B and the ridges 40 of pattern C provide improved venting of entrapped gases. The improved venting greatly minimizes the occurrence of surface blemishes that occur as a result of entrapped gases during the molding process.

The combination of reduced occurrence of surface blemishes and the masking of those that might occur greatly reduces the potential of producing a cosmetically unacceptable product.

The visual appearance of the tire 10 is believed to be an improvement over currently available products. The design pattern B yields a striped character having a dynamic visual impression. The wide decorative band formed by pattern A provides a background which enhances the characters formed by pattern B. The wide decorative band of pattern A has changing light reflection characteristics as a function of the alternating ridge height sequence and the observer's perspective view. The ridges 20 of pattern A tend to deflect light and exhibit a shiny appearance in relation to the alternating ridge height.

It has been observed that a tire made according to the present invention has characters of changing visual appearance as a function of the background pattern A's alternating sequence relative to the tire's indicia.

The prior art tires of the past were designed to maximize contrast by using a combination of protruding flat letters or outlined lettering on a flat background, striped letters on a flat background, or flat letters on a striped background. The use of striped lettering in combination with a striped alternating background as described above achieves a novel contrast changing appearance heretofore unachieved in tire sidewall marking.

In the preferred embodiment, the tire sidewall comprises an elastomer pigmented with carbon black. This sidewall is commonly called a blackwall tire. It is believed that the sidewall could be pigmented white, as in white sidewall tires, or any other color and still achieve the visual contrast effects as described above.

What is claimed is:

1. A tire having a sidewall, the sidewall having an exterior surface, the exterior surface comprising: a design pattern A, the pattern A having a plurality of spaced ridges of similar substantially triangular or trapezoidal cross-sectional shape, each ridge being substantially radially extending and substantially parallel to an adjacent ridge and having a peak, a height, a depth, a base width and a spacing S from base to adjacent ridge base and where the ridges vary in height (h) or depth(d), as measured from peak to base spacing S for height and the radially outermost peak to the space S for depth from base to base of adjacent ridges, the varied height or depth of one ridge being different from an adjacent parallel ridge and the ridges being arranged in a repeating sequence around the circumference of the exterior surface forming a wide band wherein the ridges have a variation in height of $h_L > h_{M2} > h_{M1} > h_S$ or a variation of depth $d_L > d_{M2} > d_{M1} > d_S$, the ridges being arranged in a repeating sequence of small to large to small of $h_S$, $h_{M1}$, $h_{M2}$, $h_L$, $h_{M2}$, $h_{M1}$, $h_S$ or $d_S$, $d_{M1}$, $d_{M2}$, $d_L$, $d_{M2}$, $d_{M1}$, $d_S$.

2. The tire of claim 1 further comprises:

a pattern B, pattern B being one or more alphanumeric symbol overlaying a portion of pattern A.

* * * * *